United States Patent
Boehringer et al.

[11] 3,890,064
[45] June 17, 1975

[54] RECIPROCATING TRANSFER PUMP

[75] Inventors: Wilfred E. Boehringer, Fullerton; Jane Little, Long Beach; Robert D. Rothi, Rolling Hills; Charles G. Westlund, Long Beach, all of Calif.

[73] Assignee: McDonnell Douglas Corporation, Santa Monica, Calif.

[22] Filed: Jan. 11, 1973

[21] Appl. No.: 322,615

[52] U.S. Cl. .................. 417/237; 60/405; 417/316; 417/403
[51] Int. Cl. ............................................ F04b 41/04
[58] Field of Search .......... 417/397, 401, 403, 404, 417/426, 237, 316; 60/403, 405; 91/305

[56] References Cited
UNITED STATES PATENTS

| | | | |
|---|---|---|---|
| 2,897,786 | 8/1959 | Geyer | 60/405 |
| 2,977,040 | 3/1961 | Dulebohn et al. | 417/225 |
| 3,077,838 | 2/1963 | Maglott | 417/397 |
| 3,082,917 | 3/1963 | Anderson et al. | 417/404 |
| 3,164,325 | 1/1965 | Veum | 417/404 |
| 3,225,663 | 12/1965 | Pelisson | 91/305 |
| 3,691,767 | 9/1972 | Coakley | 60/405 |

FOREIGN PATENTS OR APPLICATIONS

| | | | |
|---|---|---|---|
| 548,208 | 4/1932 | Germany | 91/305 |

Primary Examiner—William L. Freeh
Assistant Examiner—Gregory Paul LaPointe
Attorney, Agent, or Firm—G. W. Finch; W. J. Jason; D. L. Royer

[57] ABSTRACT

A reversible reciprocating motor pump for transferring energy from one hydraulic system to another. The motor pump includes a pair of similar hydraulic cylinders connected back to back and controlled by interconnected control valves that properly sequence and phase the in and out flows to the hydraulic cylinders so hydraulic energy can be transferred from one system to the other without transferring hydraulic fluid therebetween.

11 Claims, 7 Drawing Figures

RECIPROCATING TRANSFER PUMP

BACKGROUND OF THE INVENTION

As aircraft have become larger, hydraulically powered flight control systems have been required. To power these systems and maintain the necessary redundancy for safety, multiple completely separate hydraulic systems have been employed with each system being powered preferably from a different prime mover, such as an aircraft engine. During aircraft takeoff and landing, large amounts of hydraulic energy must be available and it is important that a failure such as the loss of an engine does not disrupt or degrade the hydraulic systems to the point where the required hydraulic energy is not available. Therefore, to protect against the possibility of a critical failure, transfer motor pumps are installed between hydraulic systems so that hydraulic energy can be transferred from one system to the other in the event that an engine driven pump in one system or the prime mover therefor fails. These motor pumps are capable of transferring energy in either direction toward the demanding system without transferring hydraulic fluid between the systems. The existing motor pumps commonly used on large aircraft such as the DC-10 are merely two rotary pumps connected together. This type of motor pump is very inefficient so there is considerably more hydraulic energy used by the motor than is produced by the pump. These prior art motor pumps also produce an undesirable noise level in the cabin area when they are on standby since the pumps must slowly turn or motor to eliminate any pressure lag that could be caused by start up friction losses. This motoring, in addition to being noisy, wastes energy and produces heat in the hydraulic system that must be removed. In some cases the removal of this additional wasteful and unneeded heat requires additional hardware on the airplane which is undesirable from a cost and weight standpoint.

SUMMARY OF THE INVENTION

The present invention is used to transfer hydraulic power from one hydraulic system to another. It employs at least one pair of equal displacement hydraulic cylinders connected back to back. Depending on which of the two hydraulic systems is in a failure mode, one cylinder becomes the motor or driver and the other the pump. The cylinders are controlled by separate interconnected control valves that properly sequence the in and out flows to the two hydraulic cylinders. The piston bottoming motion within the hydraulic cylinders is utilized to drive a flipflop mechanism that in turn repositions each control valve to cause the motor pump to reciprocate.

To reverse the flow of energy from one system to the other, the phase of the control valves must be changed by 180°. The phase change requirement is signaled by an unfavorable differential pressure between the two systems. When a predetermined system to system differential pressure is reached, phase changing means are energized to reposition the control valves in the proper phase relationship with respect to the hydraulic cylinders.

To prevent power surges or hydraulic hammer during high flow outputs, the control valves are repositioned when the flow has decreased at the cylinder end travel. The flow decrease is accomplished by suitable damping means which act in conjunction with the end travel of the pistons within the cylinders.

The present invention can be used in any application where a transfer pump is desired to transmit power but not fluid between two hydraulic systems in either direction. The volumetric efficiency of the present motor pump is extremely high and it is almost noiseless. Due to the pumping efficiency and no requirement to motor when in the standby mode, the excessive heat generation caused by the prior art pumps is eliminated and with it the problems of removing the excessive heat from the hydraulic systems.

It is therefore an object of the present invention to provide means for transferring hydraulic energy between hydraulic systems without transferring fluid therebetween.

Another object is to provide a reversible motor pump which can transfer energy between hydraulic systems with high efficiency.

Another object is to provide means which transfer energy between hydraulic systems without generating heat and noise.

Another object is to provide a reversible motor pump which can be constructed relatively economically.

Another object is to provide a reversible motor pump for transferring energy between hydraulic systems which can sense which system is in need of energy and transfer the energy into that system.

Another object is to provide means for transferring hydraulic energy from one system to another which can be adapted to transfer the energy at any conceivable flow rate.

These and other objects and advantages of the present invention will become apparent after considering the following detailed specification which covers preferred embodiments thereof in conjunction with the accompanying drawings wherein:

DETAILED DESCRIPTION OF THE SHOWN EMBODIMENTS

Figure 1:
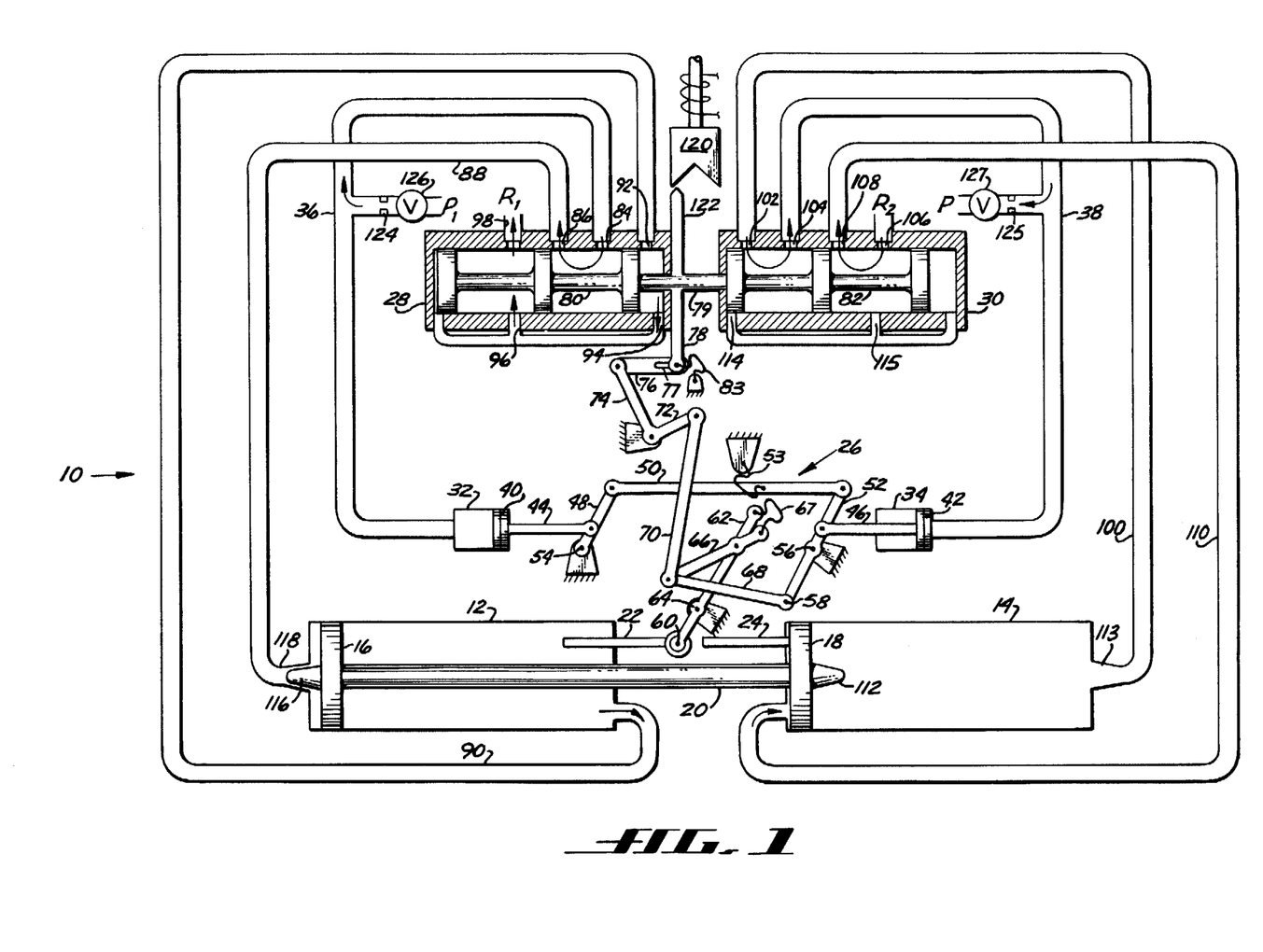
FIG. 1 is a simplified diagrammatic representation of a reversible motor pump constructed according to the present invention.

Referring to the drawings more particularly by reference numbers, number 10 in FIG. 1 refers to a reciprocating motor pump constructed according to the present invention. The motor pump 10 includes two hydraulic cylinders 12 and 14 whose pistons 16 and 18 are connected together by a rod 20. Means are provided such as tappets 22 and 24 to sense the bottoming of piston 16 or 18 in the hydraulic cylinder 12 or 14. This bottoming is used as a signal to reverse the flows within the cylinders 12 and 14. In the motor pump 10, the signals from the poppets 22 and 24 are passed through an overcenter flipflop mechanism 26 to a pair of control valves 28 and 30. The control valves 28 and 30 are each connected to a separate hydraulic system with $P_1$ and $R_1$ indicating the pressure and return connections of system one and $P_2$ and $R_2$ indicating the pressure and return connections of system two. The pressure at $P_1$ is nominally equal to the pressure at $P_2$ when both hydraulic systems are operating normally. When there is a failure in one of the sytems and the pressure in the failed system drops a predetermined amount below the pressure in the other system, means are provided to sense the predetermined differential pressure and to properly phase the control valves 28 and 30 with respect to the hydraulic cylinders 12 and 14. The motor pump 10 then transfers hydraulic power from the normal system to the failed system.

In FIG. 1 the motor pump 10 is shown in a condition indicating hydraulic system two has lost pressure and therefore, the overcenter mechanism 26 is in a condition to properly phase the control valves 28 and 30 with the cylinders 12 and 14 to transfer energy from system one to system two. The phasing is accomplished by connecting the pressures at $P_1$ and $P_2$ to auxiliary hydraulic cylinders 32 and 34 by means of lines 36 and 38 respectively. Pistons 40 and 42 within the cylinders 32 and 34 are connected together by means of connecting rods 44 and 46 and parallel linkage including connected links 48, 50 and 52. It should be obvious from the orientation of the motor pump 10 in FIG. 1 that reduced pressure in system two as applied to the piston 42 by line 38 allows pistons 40 and 42 and links 48, 50 and 52 to snap to the right. The snap action, in response to the predetermined differential pressure, is provided by overcenter means such as the compression spring 53 connected between link 50 and structure. Links 48 and 52 pivot about fixed locations 54 and 56 and a portion of link 52 extend below the location 56 to form a pivot point 58 whose location is stationary as long as the driving system and the receiving system remain the same.

Figure 2:
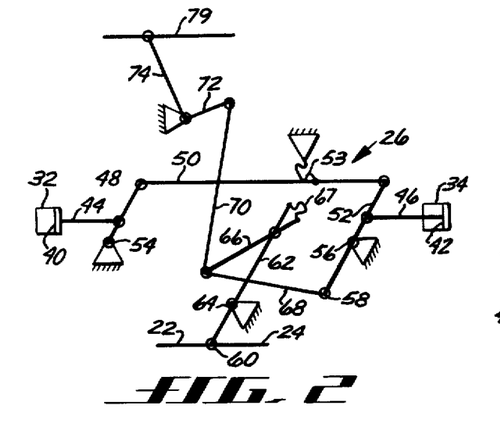
FIGS. 2 through 5 are schematic diagrams of the mechanical linkage of FIG. 1 in various positions.
Figure 3:
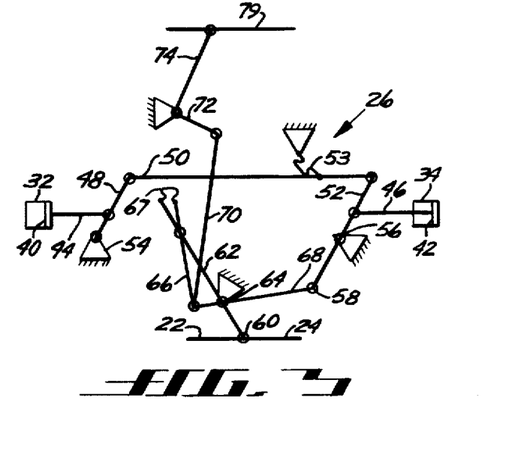

The tappets 22 and 24 signal the location of the pistons 16 and 18 to the flipflop mechanism 26 by driving the lower end 60 of a lever 62. The lever 62 is pivoted about point 64 so that it can rotate between the position shown in FIGS. 1 and 2 and the position shown in FIG. 3 in response to force applied thereto by the tappets 22 and 24. The lever 62 is pivotally connected to a link 66 adjacent the upper end thereof. Overcenter means, such as compression spring 67, are connected between the lever 62 and the link 66 so the lever 62 tends to snap between the stable postion shown in FIGS. 1, 2 and 5 and the stable position shown in FIGS. 3 and 4. The spring 67 therefore assures there will be no "dead spot" in the mechanism 26 which would cause the motor pump 10 to cease its reciprocation.

The link 66 is pivotally connected to links 68 and 70 at the other end thereof. Link 68 is connected on its opposite end to the point 58 so that links 66 and 68 vertically position the connected end of link 70 in accordance with the phase desired and the last bottom position of the pistons 16 and 18. The opposite end of the link 70 is connected to the arm 72 of a lever 74 pivoted to the structure whose opposite end is connected by a link 76 having a slot 77 therein and an arm 78 to the connecting rod 79 between the valve spools 80 and 82 of the control valves 28 and 30 respectively. The arm 78 is spring loaded by a compression spring 83 so the spools 80 and 82 snap from one side to the other in response to inputs from the mechanism 26. The slot 77 provides some lost motion between the link 76 and the arm 78 to allow the snap action.

The control valves 28 and 30 are essentially mirror image duplicates of each other as shown. When the motor pump 10 is in the condition shown in FIG. 1, which is just after a reciprocation cycle, the control valves 28 and 30 feed the pressure and return flows to the cylinders 12 and 14 so the rod 20 and its attached pistons 16 and 18 move to the right. The valve 28 receives pressurized fluid from line 36 which fluid passes through valve ports 84 and 86 to a line 88 which connects the pressurized fluid to the head side of the piston 16 forcing it to the right. Fluid from the rod side of the piston 16 is returned from the cylinder 12 by line 90 and valve ports 92, 94, 96 and 98 to return $R_1$. At the same time piston 16 moves to the right, piston 18 also moves to the right causing the fluid within the cylinder 14 on the head side of the piston 16 to flow under pressure through line 100 and ports 102 and 104 to the pressure line 38 of system two thereby supplying pressurized fluid to system two. As piston 18 moves to the right, fluid must be returned to the piston rod side of the cylinder 14. This is accomplished through ports 106 and 108 in the valve 30 and line 110 which connects port 108 to the piston rod side of the cylinder 14.

As the pistons 16 and 18 and the rod 20 approach the end of the allowable travel in the cylinders 12 and 14, a metering pin 112 extending from the head of piston 18 enters a metering chamber 113 in the cylinder 14 to choke the pressurized flow in line 100, reduce the velocity of the pistons 16 and 18, and prevent pressure peaks when the flipflop mechanism 26 and the control valves 28 and 30 reverse. At the same time the piston 16 engages the tappet 22, pushing it against the lower end 60 of the lever 62 to move the flipflop mechanism 26 from the position shown in FIGS. 1 and 2 to the position shown in FIG. 3. This moves the valve spools 80 and 82 of the valves 28 and 30 to the right to their opposite positions so pressurized flow in valve 28 passes from port 84 to port 92, pressurizing line 90 and driving piston 16 back to the left. The return flow from the piston head side of the cylinder 12 passes through line 88 and ports 86 and 98. Simultaneously, pressurized fluid is connected from the piston rod side of cylinder 14 to the pressure side of system two by means of line 110 and ports 108 and 104 thereby continuing to supply hydraulic energy to the pressure side of system two. The return flow to the head side of piston 18 is by means of ports 106, 115, 114 and 102 and line 100. As the pistons 16 and 18 approach the left extremity of their travel, a metering pin 116 extending from the head of piston 16 protrudes into a metering chamber 118 in the cylinder 12 similar to metering chamber 113 to reduce the flow through line 88 as the flipflop mechanism 26 and control valves 28 and 30 again reverse causing the reciprocation to continue.

Figure 4:
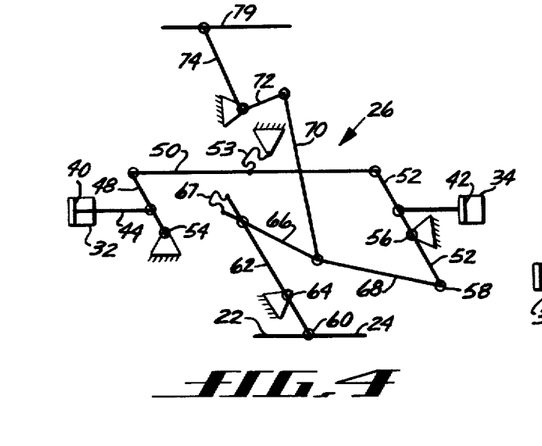
Figure 5:
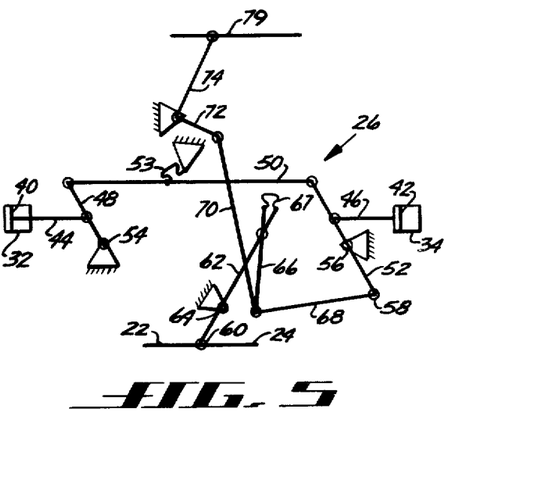

As can be seen in FIGS. 4 and 5, the movement of the pistons 40 and 42 and the link 50 to the left indicating system one is the failed system causes the mechanism 26 to move the connecting rod 79 of the control valve spools 80 and 82 to the left when the tappets 22 and 24 move to the right and viceversa. This effects a 180° phase chanage between the pistons 16 and 18 and the control valves 28 and 30 so that hydraulic energy can be transferred from system two into system one.

Various control devices can be used on a motor pump such as that shown in FIG. 1 including means to lock the valve spools 80 and 82 in a centered position so that all flow within the motor pump 10 is blocked by the valve spools 80 and 82. Such means are shown as a solenoid operated wedge 120 which operates on an arm 122 extending from the valve spool connecting rod 79 tto lock the spools 80 and 82 in a centered position. When in the centered positions, the spools 80 and 82 block ports 86, 92, 102 and 108 to prevent any motion of the pistons 16 and 18 within the cylinders 12 and 14. Flow regulators 124 and 125 can also be placed in the pressure lines $P_1$ and $P_2$ to limit the total amount of energy that can be transferred from one system to the other so that in the event the fluid leaks out of one system, the other system does not waste more than a limited amount of its energy in a futile effort. Other means such as solenoid operated turn-off valves 126 and 127 can also be employed to control the flows to the motor pump 10.

Figure 6:
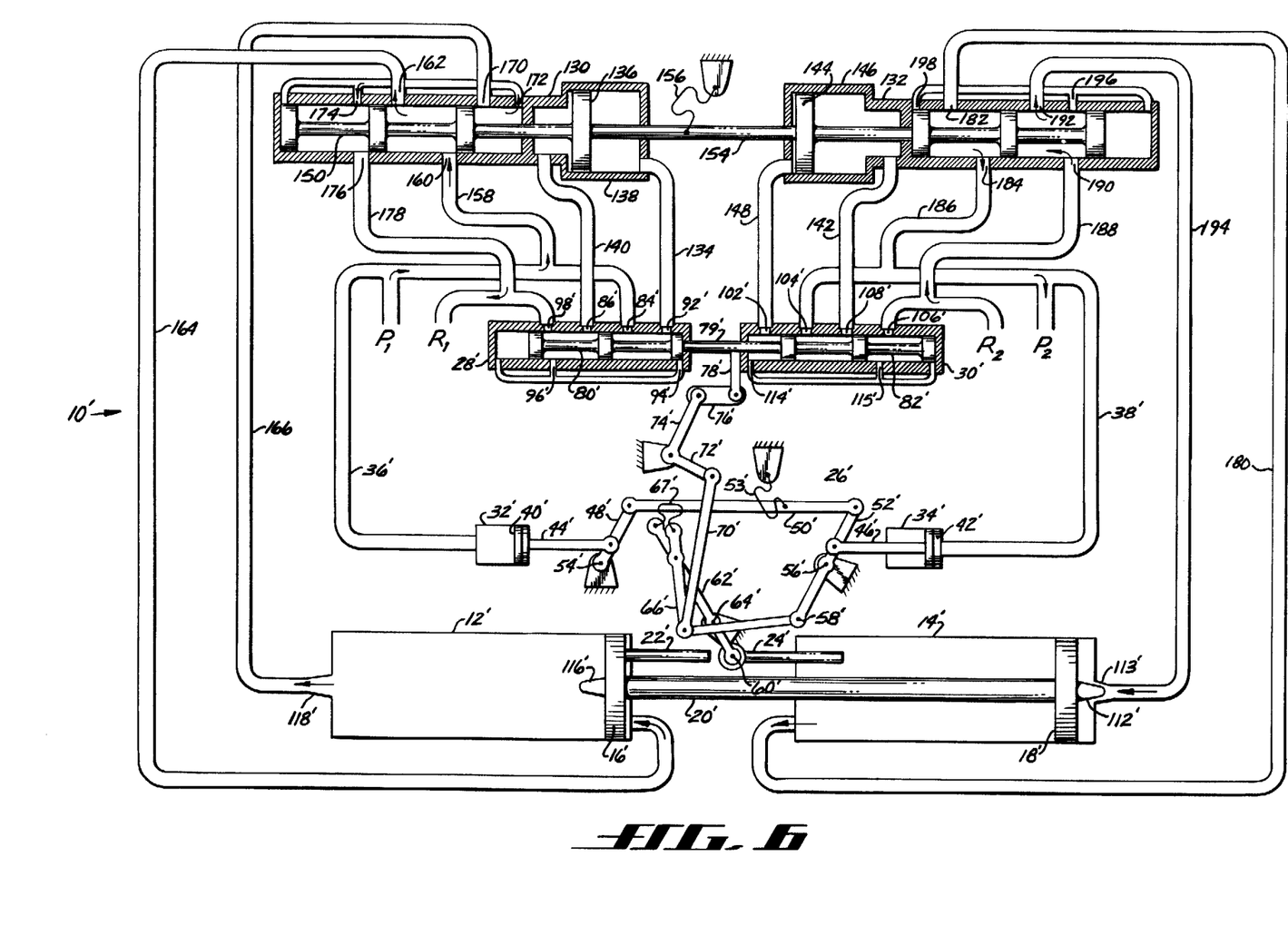
FIG. 6 is a diagrammatic representation of a reciprocal motor pump similar to that shown in FIG. 1 but including pilot valves to compensate for large valve force levels present in large capacity motor pumps.

FIG. 6 illustrates a slightly modified motor pump 10' for use when large flow rate requirements require pilot operated control valves to cope wit high valving forces. The portions of the motor pump 10' similar to motor pump 10 have the same number with a prime added thereto.

Motor pump 10' is shown in FIG. 6 in the condition where system two has failed and the flipflop mechanism 26' and the pilot valves 28' and 30' have just reversed. Instead of feeding the cylinders 12' and 14' directly, the pilot valves 28' and 30' do so indirectly through main control valves 130 and 132. For example, in the position shown in FIG. 6, the pilot valve 28' allows pressurized fluid to flow through port 84' and 92' and line 134 to one side of a control valve driving piston 136 within an actuator chamber 138. At the same time, fluid from the opposite side of piston 136 flows through line 140 and ports 86' and 98' to return thus allowing the piston 136 to move to the left to the position shown. Assuming that pressurized fluid exists in system two, the pilot valve 30' enables communication of pressurized fluid through port 104', port 108' and line 142 to the right side of a control valve driving piston 144 within an actuator chamber 146. Simultaneously, line 148 on the opposite side of piston 144 transmits fluid back through pilot valve 30' by means of ports 102', 114', 115' and 106' to return.

The pistons 136 and 144 are connected to the spools 150 and 152 in their respective control valves 130 and 132 and together by connecting rod 154. Overcenter means such as a compression spring 156 are connected to the connecting rod 154 so that the assembly of spools, pistons and rods snap from one extremity of travel to the other in response to the flows received from the pilot valves 28' and 30'.

The control valves 130 and 132 as shown are essentially larger duplicates of control valves 28 and 30. For example, when the motor pump 10' is in the condition shown in FIG. 6 which is just at the start of a reciprocation cycle, the control valves 130 and 132 connect the pressure and return lines to the cylinders 12' and 14' so the rod 20' and its attached pistons 16' and 18' move to the left. The valve 130 is receiving pressurized fluid from line 158 which passes through ports 160 and 162 to line 164 which feeds the pressurized fluid to the cylinder 12' on the rod side of piston 16' forcing it to the left. At the same time, fluid from the head side of the piston 16' is returned from the cylinder 12' by the line 166. The fluid flows through the line 166 and ports 170, 172, 174 and 176 and line 178 to return. Concurrently, piston 18' also moves to the left causing the fluid within the cylinder 14' on the rod side of the piston 18' to flow under pressure through line 180, ports 182 and 184 and line 186 to supply pressurized fluid to system two. As the piston 18' moves to the left, fluid must be returned to the head side of the cylinder 14'. This is accomplished through line 188, ports 190 and 192 and line 194 which connects the port 192 to the piston head side of cylinder 14'.

When the control valves 130 and 132 are switched to their opposite positions by the pilot valves 28' and 30' the spools 150 and 152 therein move to their far right extremity. The pressurized flow in valve 130 then passes from port 160 to port 170 where it is fed by line 166 to the piston head side of cylinder 12' driving the piston 16' back to the right. The return flow from the piston rod side of the cylinder 12' passes through line 164, ports 162 and 176 to line 178 to return. Concurrently, fluid pressurized by the reciprocating action is connected from the piston head side of cylinder 14' to the pressure side of system two by means of line 194, ports 192 and 184 and line 186 thereby continuing to supply hydraulic energy to the pressure side of system two. The return flow to the piston rod side of cylinder 14' is by means of line 188, ports 190, 196, 198 and 182 and iine 180. Thus by using the simple expedient of pilot valve operated control valves, the present invention can be used no matter how much hydraulic energy must be transferred from one system to the other.

Figure 7:
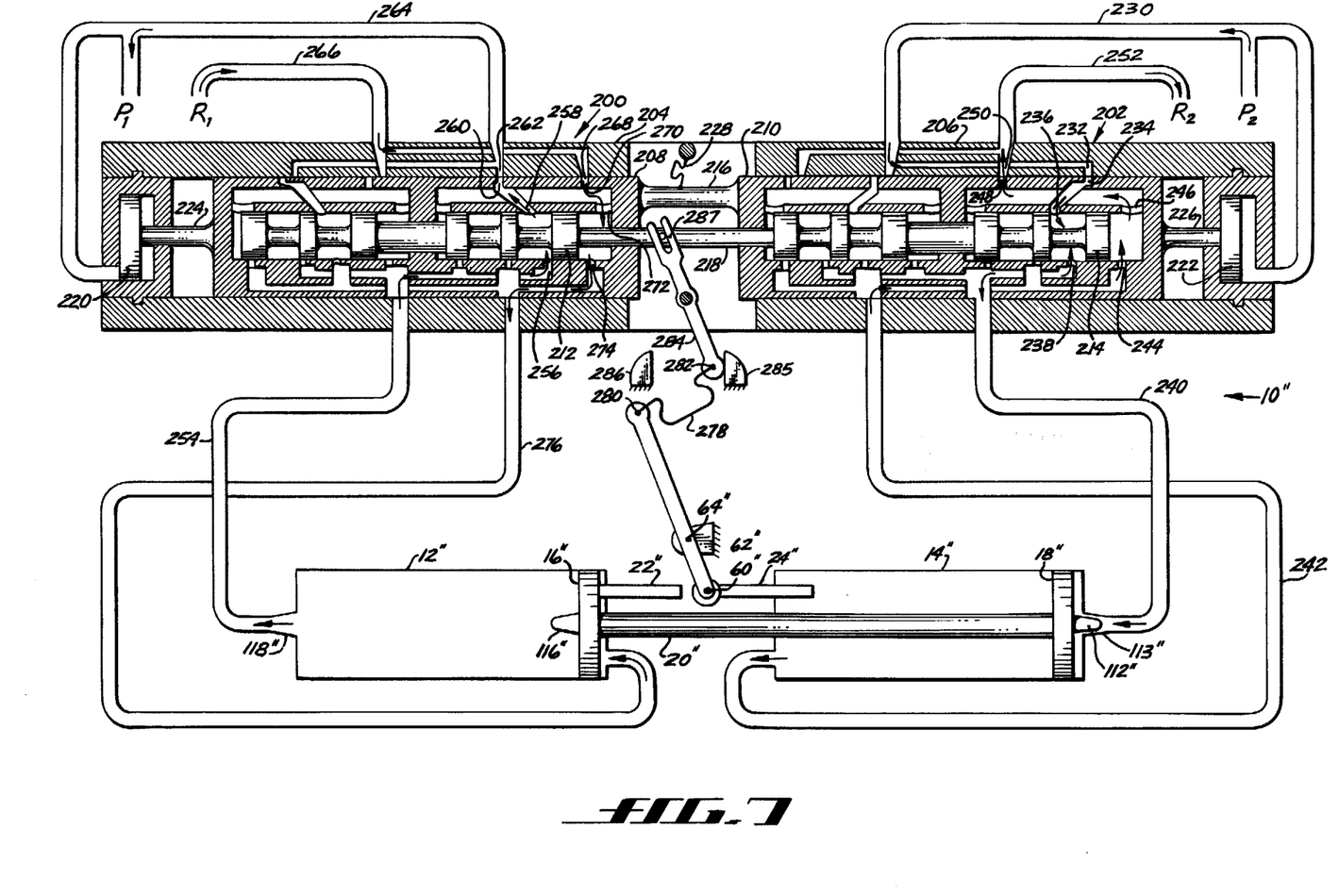
FIG. 7 is a diagrammatic representation of a reciprocating motor pump utilizing a phase changing valve rather than the mechanical phase changing linkage of the motor pump shown in FIGS. 1 and 6.

The present invention can also be constructed without the complexity of a phase reversing flipflop mechanism such as mechanism 26 or 26'. Such a motor pump 10'' is shown in FIG. 7. The portions of FIG. 7 similar to the portions of the motor pumps 10 and 10' have the same numbers with a double prime ('') added thereto. In the motor pump 10'', the phase reversal means are included with the control valves 200 and 202. The control valves 200 and 202 include a housing 204 and 206, valve sleeves 208 and 210 and valve spools 212 and 214 respectively. The housings 204 and 206 are connected together by structure while sleeves 208 and 210 are connected by connecting rod 216 and spools 212 and 214 are connected by another connecting rod 218. The control valves 200 and 202 are arranged so that movement of the sleeves 208 and 210 causes a phase reversal of the control valves 200 and 202 and that movement of the spools 212 and 214 causes reversal of the flows to the cylinders 12'' and 14'' to cause reciprocation of the pistons 16'' and 18'' therein.

The reversal of the phasing is accomplished by connecting the pressure sides of system one and two to act against opposed pistons 220 and 222 which are connected to the sleeves 208 and 210, respectively, by means of connecting rods 224 and 226. When the pressure in one system is greater by a predetermined amount than the pressure in the other system, the pistons 220 and 222 cause the sleeves 208 and 210 to snap into the proper phasing position which enables the transfer of hydraulic energy from the high pressure system to the low pressure system. The snap action is provided by overcenter means such as the compression spring 228 connected between the rod 216 and structure. In FIG. 7 it should be obvious that system two is the high pressure system and therefore energy will be transferred from system two to system one.

In the position shown in FIG. 7 the motor pump 10" is just starting a reciprocation cycle with piston 16" and 18" commencing to move to the left. To accomplish this movement to the left, pressurized fluid must be supplied to cylinder 14" on the head side of piston 18". This is accomplished through pressure line 230 which feeds pressurized fluid to the housing 206 where it is transmitted by port 232 to port 234 in the sleeve 210 and from there to port 236 and 238 as controlled by the spool 214 and from there into line 240 to the head side of cylinder 14". The return from the piston rod side of the cylinder 14" is by means of line 242 which feeds the return flow to the sleeve 210 and through ports 244, 246, 248, and 250 to the return line 252.

Because of the driving action of the piston 18", piston 16" moves to the left pressurizing the fluid in the head side of cylinder 12". This pressurized flow passes through line 254 into the control valve 200 and is transmitted by means of ports 256, 258, 260 and 262 to the pressure line 264 to thereby supply pressurized fluid to system one. The return path to supply fluid to the piston rod side of cylinder 12" is provided by means of line 266, ports 268, 270, 272, and 274 and line 276. When the pistons 16" and 18" approach the end of their travel to the left, piston 18" comes in contact with tappet 24" which in turn pushes the end 60" of lever 62" about its pivot 64". The rotation of the lever 62" compresses overcenter means, such as compression spring 278 connected between the upper end 280 of a lever 62" and the lower end 282 of a spool driving lever 284. When the lever 62" has rotated to a predetermined angle, the compression spring 278 snaps the lever 284 from the position shown in FIG. 7 with the lever 284 against the stop 285 clockwise to an opposite position with the lever 284 against stop 286. The upper end 287 of lever 284 engages the connecting rod 218 and therefor snaps the spools 212 and 214 to the right which, as in the case of control valves 28 and 30, and 28' and 30', causes the piston 16" and 18" to reciprocate in the opposite direction. It should be obvious at this point that the control valves 200 and 202 are in effect each two control valves connected together with the sleeves 208 and 210 being able to switch one or the other portions of each control valve on and off to properly phase the control valves 200 and 202 with respect to the driving and driven systems. Therefore, in the previous examples where the right hand portions of the control valves 200 and 202 are used when system two is the driving system, the left hand portions thereof which operate in a similar manner but with 180° phase change are used when system one is the driving system.

It should be obvious that the various features of the shown embodiments can be combined so that just about all the features detailed in the foregoing are present in a single, reciprocating motor pump configuration. For example, the solenoid operated wedge 120 or other locking device along with the flow regulators 124, 125, the valves 126 and 127 can be added to a device constructed like FIG. 6 but having a pilot valve constructed like the control valve of FIG. 7 with the elimination of the mechanical linkage. Other combinations are also possible.

Thus there has been shown and described novel means for transferring hydraulic energy from one hydraulic system to another without transferring hydraulic fluid therebetween which fulfills all the objects and advantages sought therefor. Many changes, modifications, variations and other uses and applications of the subject motor pump will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A motor pump for transferring hydraulic energy between first and second hydraulic systems, said motor pump including:

first and second hydraulic cylinders including first and second pistons each having first and second sides, and connecting means connected between the second sides of said first and second pistons;

first control valve means connected between the pressure and return lines of the first hydraulic system and said first hydraulic cylinder, said first control valve means having a first position connecting the pressure and return lines of the first hydraulic system to said first and second sides of said first piston respectively and a second position connecting the pressure and return lines of the first hydraulic system to said second and first sides of said first piston respectively when said motor pump is transferring hydraulic energy from the first hydraulic system to the second;

a second control valve means connected between the pressure and return lines of the second hydraulic system and said second hydraulic cylinder, said second control valve means having a first position connecting the pressure and return lines of the second hydraulic system to said second and first sides of said second piston respectively and a second position connecting the pressure and return lines of the second hydraulic system to said first and second sides of said second piston respectively when said motor pump is transferring hydraulic energy from the first hydraulic system to the second;

first sensing means to sense first and second predetermined positions of said pistons within said cylinders and to produce outputs in response thereto;

positioning means connected to said sensing means outputs for positioning said control valve means in their first and second positions in response to the predetermined positions of said pistons; and second sensing means connected to the first and second hydraulic system to sense which system needs hydraulic energy transferred to it, said second sensing means including reversing means connected to said first and second control valve means, said reversing means reversing the connections between said first and second control valve means and said first and second hydraulic cylinders when the need is sensed by said sensing means so hydraulic energy is transferred to the system in need.

2. The motor pump defined in claim 1 wherein said first control valve means include:

a first pilot valve operatively connected to said positioning means; and a first control valve adapted to be controlled by said first pilot valve, said first control valve controlling the communication between the first hydraulic system and said first hydraulic cylinder, and wherein said second control valve means include:

a second pilot valve operatively connected to said positioning means; and a second control valve adapted to be controlled by said second pilot valve, said second control valve controlling the communication between the second hydraulic system and said second hydraulic cylinder.

3. The motor pump defined in claim 1 wherein said second sensing means include overcenter means connected to said reversing means of said second sensing means to bias said reversing means into opposite phasing positions in response to predetermined differential pressures between the first and second hydraulic systems to thereby reverse the connections between said first control valve means and said first hydraulic cylinder and also reverse the connections between said second control valve means and said second hydraulic cylinder for the predetermined positions of said pistons in said first and second hydraulic cylinders.

4. The motor pump defined in claim 1 wherein said second sensing means include:

a first sensing cylinder having a piston therein and being connected to the pressure of the first hydraulic system;

a second sensing cylinder having a piston therein and being connected to the pressure of the second hydraulic system; and connecting means for connecting said pistons of said first and second sensing cylinders, said connecting means including said means to properly phase said first and second control valve means so energy is transferred toward the low pressure system and overcenter means for causing said connecting means to snap between opposite phasing positions in response to a predetermined differential pressure as applied to said pistons of said first and second sensing cylinders by the first and second hydraulic systems.

5. The motor pump defined in claim 1 wherein said first control valve means include:

a valve housing having connections to said first hydraulic cylinder and to the first hydraulic system;

a movable sleeve member in said valve housing connected to said second sensing means and moved thereby for reversing the phase of said first control valve means with respect to the predetermined positions of said pistons in said first and second cylinders; and a valve spool in said sleeve member operatively connected to said positioning means for reversing the connections to said first hydraulic cylinder in response to the predetermined positions of said pistons.

6. The motor pump defined in claim 5 wherein said second control valve means include:

a valve housing having connections to said second hydraulic cylinder and to the second hydraulic system;

a movable sleeve member in said second control valve means valve housing connected to said second sensing means and moved thereby for reversing the phase of said second control valve means with respect to the predetermined positions of said pistons in said first and second cylinders; and a valve spool in said sleeve member of said second control valve means operatively connected to said positioning means for reversing the connections to said second hydraulic cylinder in response to the predetermined positions of said pistons, said sleeve members of said first and second control valve means being connected to operate in unison and said valve spools of said first and second control valve means being connected to operate in unison.

7. The motor pump defined in claim 6 including pilot valve means, said valve spools of said first and second control valve means being operatively connected to said positioning means by said pilot valve means.

8. The motor pump defined in claim 1 wherein said first sensing means include:

a first tappet positioned in said first hydraulic cylinder to contact said piston therein when said piston is approaching one of its extremes of travel within said first hydraulic cylinder; and a second tappet positioned in said second hydraulic cylinder to contact said piston therein when said piston is approaching one of its extremes of travel within said second hydraulic cylinder and said piston in said first hydraulic cylinder is approaching its extreme of travel in which it does not contract said first tappet.

9. The motor pump defined in claim 1 wherein said first and second cylinders include damping means which reduce the flow of hydraulic fluid therein when said pistons are approaching their extremes of travel within said hydraulic cylinders.

10. The motor pump defined in claim 1 wherein said first and second hydraulic cylinders are of equal sizes.

11. A motor pump for transferring hydraulic energy between first and second hydraulic systems, said motor pump including:

first and second hydraulic cylinders including first and second pistons having first and second sides, and connecting means connected between the second sides of said first and second pistons;

first control valve means connected between the pressure and return lines of the first hydraulic system and said first hydraulic cylinder, said first control valve means having a first position connecting the pressure and return lines of the first hydraulic system to said first and second sides of said first piston respectively and a second position connecting the pressure and return lines of the first hydraulic system to said second and first sides of said first piston respectively;

a second control valve means connected between the pressure and return lines of the second hydraulic system and said second hydraulic cylinder, said second control valve means having a first position connecting the pressure and return lines of the second hydraulic system to said second and first sides of said second piston respectively and a second position connecting the pressure and return lines of the second hydraulic system to said first and second sides of said second piston respectively;

first sensing means to sense first and second predetermined positions of said pistons within said cylinders and to produce outputs in response thereto;

positioning means connected to said sensing means outputs for positioning said control valve means in their first and second positions in response to the predetermined positions of said pistons; and second sensing means connected to the first and second hydraulic system to sense which system needs hydraulic energy transferred to it, said second sensing means including phasing means to properly phase said first and second control valve means so hydraulic energy is transferred to the system in need, said first and second control valve means also having a locking position which prevents hydraulic flow to said first and second hydraulic cylinders and said motor pump further including means to hold said first and second control valve means in said locking position to prevent operation of saiad motor pump.

* * * * *